United States Patent
Van Giesen et al.

(10) Patent No.: US 11,897,177 B2
(45) Date of Patent: Feb. 13, 2024

(54) METHOD FOR MANUFACTURING A STRUCTURAL BEAM, STRUCTURAL BEAM, AND BUILDING COMPRISING SUCH A BEAM

(71) Applicant: SABIC GLOBAL TECHNOLOGIES B.V., Bergen Op Zoom (NL)

(72) Inventors: Roland Van Giesen, Geleen (NL); Henrica Norberta Alberta Maria Steenbakkers-Menting, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 890 days.

(21) Appl. No.: 16/474,584

(22) PCT Filed: Dec. 22, 2017

(86) PCT No.: PCT/EP2017/084481
§ 371 (c)(1),
(2) Date: Jun. 28, 2019

(87) PCT Pub. No.: WO2018/122193
PCT Pub. Date: Jul. 5, 2018

(65) Prior Publication Data
US 2020/0123774 A1    Apr. 23, 2020

(30) Foreign Application Priority Data
Jan. 2, 2017 (EP) .................................... 17150046

(51) Int. Cl.
*B29C 48/21* (2019.01)
*B29C 48/155* (2019.01)
(Continued)

(52) U.S. Cl.
CPC ............ *B29C 48/21* (2019.02); *B29C 48/155* (2019.02); *B29C 48/304* (2019.02); *E04C 3/29* (2013.01);
(Continued)

(58) Field of Classification Search
CPC ..... B29C 48/21; B29C 48/155; B29C 48/304; B29C 48/15; B29C 48/34; B29C 48/16;
(Continued)

(56) References Cited

U.S. PATENT DOCUMENTS 2,309,903 A * 2/1943 Hume ................. B28B 19/0038
425/84
4,058,580 A * 11/1977 Flanders ................... E04C 3/28
264/122
(Continued)

FOREIGN PATENT DOCUMENTS

CN    201962851 U    9/2011
EP    1249551 A1    10/2002
(Continued)

OTHER PUBLICATIONS

Merriam-Webster, Strip, Jan. 19, 2014 retrieved Nov. 8, 2022 url: https://web.archive.org/web/20140119121617/http://www.merriam-webster.com/dictionary/strip (Year: 2014).*

(Continued)

*Primary Examiner* — Francisco W Tschen
*Assistant Examiner* — Elisa H Vera
(74) *Attorney, Agent, or Firm* — CANTOR COLBURN LLP

(57) ABSTRACT

A method of manufacturing a structural beam comprising an elongate base part comprising a polymer. The base part has a length, a width and a height. The beam also comprises an elongate reinforcement part comprising a strip comprising a unidirectional polymer, bonded to the base part at an outer
(Continued)

surface of the base part and extending in the length direction along the length of the base part. The strip has a higher Young's modulus than the base part. The method also relates to a beam and to a building comprising such a beam.

18 Claims, 3 Drawing Sheets

(51) Int. Cl.
  *B29C 48/30* (2019.01)
  *E04C 3/29* (2006.01)
  *B29K 105/10* (2006.01)
  *B29L 31/00* (2006.01)
(52) U.S. Cl.
  CPC ... *B29K 2105/106* (2013.01); *B29L 2031/001* (2013.01)
(58) Field of Classification Search
  CPC ..... E04C 3/29; E04C 5/07; E04C 3/28; B29K 2105/106; B29L 2031/001
  See application file for complete search history.

(56) References Cited

U.S. PATENT DOCUMENTS

| | | | | |
|---|---|---|---|---|
| 6,146,576 | A | * | 11/2000 | Blackmore ........... B29C 66/496 425/389 |
| 2003/0157280 | A1 | * | 8/2003 | Boissonnat ............. E06B 3/221 425/114 |
| 2004/0062915 | A1 | | 4/2004 | Pabedinskas et al. |
| 2004/0191441 | A1 | | 9/2004 | Bureau et al. |
| 2004/0219357 | A1 | | 11/2004 | Van Dijk et al. |
| 2005/0108983 | A1 | | 5/2005 | Simko et al. |
| 2006/0070340 | A1 | | 4/2006 | Fanucci et al. |
| 2007/0092707 | A1 | | 4/2007 | Anderson et al. |
| 2008/0003427 | A1 | | 1/2008 | Van Dijk et al. |
| 2016/0245175 | A1 | * | 8/2016 | Clarkson ................. F02C 7/047 |
| 2016/0254175 | A1 | * | 9/2016 | Yang ................... H01L 21/6838 29/407.09 |
| 2016/0289968 | A1 | * | 10/2016 | De Waal ................... E04C 3/12 |
| 2018/0311915 | A1 | * | 11/2018 | Mukherji ................ B32B 27/40 |

FOREIGN PATENT DOCUMENTS

| | | | | |
|---|---|---|---|---|
| EP | 2952668 | A1 * | 12/2015 | ............... E06B 1/16 |
| JP | 2006152665 | A * | 6/2006 | |
| WO | 2016142784 | A1 | 9/2016 | |

OTHER PUBLICATIONS

JP-2006152665-A English translation retrieved from Espacenet on May 20, 2023 (Year: 2023).*
Shaoming et al.;"Polymeric Material Molding Engineering"; China Light Industry Press; Jun. 2014; pp. 134-135.
International Search Report; International Application No. PCT/EP2017/084481; International Filing Date: Dec. 22, 2017; dated Mar. 21, 2018; 4 pages.
Written Opinion; International Application No. PCT/EP2017/084481; International Filing Date: Dec. 22, 2017; dated Mar. 21, 2018; 8 pages.

* cited by examiner

US 11,897,177 B2

METHOD FOR MANUFACTURING A STRUCTURAL BEAM, STRUCTURAL BEAM, AND BUILDING COMPRISING SUCH A BEAM

CROSS REFERENCE TO RELATED APPLICATIONS

This application is a 371 of International Application No. PCT/EP2017/084481, filed Dec. 22, 2017, which is incorporated by reference in its entirety, and which claims priority to European Application No. 17150046.5, filed Jan. 2, 2017.

TECHNICAL FIELD

The present teachings relate to a structural beam, and in particular to a structural beam for use as a building structural element, such as a roof beam for supporting the roof of a building, or as a floor beam or wall beam.

BACKGROUND

Roof beams, such as rafters, purlins and ridge beams, are typically made of timber such as oak, or are made of steel. A requirement for such roof beams is a high bending stiffness. It is cumbersome to place such beams in a building, because of the relatively large weight of such beams.

SUMMARY

It is an object of the invention to provide a lightweight structural beam having a relatively high bending stiffness. Said object of the present invention is achieved by the various aspects of the present invention.

In a first aspect, the invention relates to a method of manufacturing of a structural beam, as defined in claim 1. The beam to be manufactured comprises an elongate base part comprising a polymer, the base part having a length, defining a length direction of the beam, and having a width and a height, and an elongate reinforcement part comprising a strip comprising a polymer and unidirectional fibers, bonded to the base part at an outer surface of the base part and extending in the length direction along the length of the base part, the strip having a higher Young's modulus than the base part.

The method of manufacturing a structural beam according to the present invention comprises

- feeding a composition comprising a polymer, for forming the base part, via an extruder, to an extrusion die,
- feeding an elongate reinforcement part comprising a strip comprising a polymer and unidirectional fibers to the extrusion die,
- forming the beam by extrusion, while bonding the elongate reinforcement part to the base part by joining the elongate reinforcement part and the composition within the extrusion die.

The base part may consist of the polymer, optionally with additives such as stabilizers and/or processing aids. The base part may also comprise or consist of a composition comprising or consisting of the polymer and fillers, such as fibers, for example glass fibers, and/or additives. The composition (if used) or the polymer defines the Young's modulus of the base part. The elongate base part may comprise at least 60 wt. % or at least 70 wt. %, preferably at least 90 wt. % or even 95 wt. % or 100 wt. % of said composition (if used) or of said polymer, in other words may consist of said composition or said polymer, optionally with additives. The composition of the strip comprises or consists of the polymer and the unidirectional fibers. Said composition of the strip defines the Young's modulus of the strip.

The structural beam manufactured according to the invention is intended to be used such that the beam is loaded with a weight transverse to the surface at which the elongate reinforcement part is provided and such that the elongate reinforcement part is provided at the surface of the beam which, in use, is subject to the highest tensile strain, that means generally at the surface that is the furthest away from the neutral axis of the beam. Thus, if a beam according to the invention would have been provided in a building such that the elongate reinforcement part is at a lower outer surface of the base part of the beam, that beam is intended to be loaded with a vertical, downward force.

The structural beam manufactured according to the present teachings may have a relatively high bending stiffness, or, resistance to bending, due to the presence of the elongate reinforcement part comprising the unidirectional fibers, the reinforcement part bonded to the base part of the beam, wherein the polymer, or the composition comprising the polymer, of the base part may be low cost, since the strip contributes to the bending strength to a large extent. Also, the structural beam according to the present invention may be effectively recycled, it may be made such that it is not sensitive to rot and/or rust and/or mold growth, it may have a longer life-time, it may be made in any feasible dimension, it may be made such that it is not hygroscopic, i.e. it does not attract water.

An effect of the strip of the elongate reinforcement part having a higher Young's modulus, or, E-modulus, than the base part is that in use under a bending load, the strain of the base part at the outer surface at which the elongate reinforcement part is provided, is reduced.

According to the present teachings, the beam is formed in a very simple and cost efficient manner by means of the extrusion process.

In the present description and claims, by "strip comprising a polymer and unidirectional fibers" is meant a strip comprising a polymer reinforced with fibers oriented in substantially one direction. For the purpose of the present invention, the fibers are oriented in substantially the length direction. Such a strip may for example be produced by impregnating a continuous fiber strand with polymer, for example as described in WO 2016/142784. The strip may have a relatively small amount of fibers oriented in a direction other than the longitudinal direction, such as in transverse, or, width direction of the strip.

The amount of fibers in the strip may vary along wide ranges, for example between 35 and 85 volume %, preferably between 50 to 75 volume %, preferably 55 to 70%, based on the total of the polymer and the fibers.

In the present description and claims, by "the strip extending along the length of the base part" is meant that the strip extends, continuously, along at least substantially the length of the base part, preferably along at least 75% of said length, further preferably along at least 90% of said length.

In an embodiment, the beam has such an elongate reinforcement part bonded to the base part at two opposite sides, or, outer surfaces, such as a top and a bottom surface, of the base part. Thus, in an embodiment the structural beam further comprises a further elongate reinforcement part comprising a further strip comprising a polymer and unidirectional fibers, bonded in accordance with the method according to the present teachings to the base part at a further outer surface of the base part opposite the outer surface and extending in the length direction along the length of the base part. The further strip thus also having a higher Young's modulus than the base part. An effect is that the beam has an increased bending stiffness in respect of a load in at least two opposite directions, such as by vertical downward and upward forces. In case that such a beam would be used as a roof beam such as a purlin, for supporting a roof of a building, the roof loads the beam downwards. Upward forces are generated by wind forces on the roof. In this case the elongate reinforcement part and the further elongate reinforcement part would thus be present on an upper and a lower outer surface, respectively.

In an embodiment the elongate reinforcement part and/or the further elongate reinforcement part comprise multiple of such strips comprising a polymer and unidirectional fibers bonded to each other. In that case the multiple strips form a stack of strips, bonded to the outer and/or further outer surface of the base part. In this case, the beam may be produced in a more convenient manner, since now each strip may be relatively thin, as the multiple strips in combination will provide the desired bending stiffness, and therefore easily be provided on a roll during production. This holds in particular for strips having a thickness of less than 1 mm.

The elongate reinforcement part is bonded to the polymer base part while forming the base part by means of extrusion (or melting). The same holds for the further elongate reinforcement part. This way, a beam according to the invention is manufactured in a highly efficient manner having a strong bond between the base part and the elongate reinforcement part and optionally the further elongated reinforcement part.

The polymer of the base part and/or the polymer of the strip and/or further strip may be chosen from the group consisting of thermoplastic polymers, including co-polymers, or blends thereof. Non-limiting examples of thermoplastic polymers include polyethylene terephthalate (PET), polycarbonates (PC), polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) or derivatives thereof, thermoplastic elastomers (TPE), terephthalic acid (TPA) elastomers, poly(cyclohexanedimethylene terephthalate) (PCT), polyethylene naphthalate (PEN), polyamides (PA), polysulfone sulfonate (PSS), polyether ether ketone (PEEK), polyether ketone ketone (PEKK), acrylonitrile butyldiene styrene (ABS), polyphenylene sulfide (PPS), co-polymers thereof, or blends thereof.

More preferred thermoplastic polymers include polypropylene, polyamides, polyethylene terephthalate, polycarbonates (PC), polybutylene terephthalate, poly(phenylene oxide) (PPO), polyetherimide, polyethylene, co-polymers thereof, or blends thereof. Even more preferred thermoplastic polymers include polypropylene, polyethylene, polyamides, polycarbonates (PC), co-polymers thereof, or blends thereof.

Examples of polypropylene include but are not limited to homopolymers of propylene, random copolymers of propylene with a C2 or C4 to C10 alpha olefin comonomer, for example ethylene; and heterophasic propylene copolymers comprising a matrix of propylene homopolymer and/or random copolymers of propylene and a dispersed propylene-alpha-olefin rubber phase, wherein the alpha-olefin may be chosen from the list consisting of C2 and C4 to C10 alpha olefin comonomers (multiple comonomers possible).

Examples of polyethylene include but are not limited to linear low density polyethylene (LLDPE), low density polyethylene (LDPE), high density polyethylene (HDPE), preferably HDPE.

The base part may comprise a composition comprising the polymer and fillers and/or additives. The strip comprising the polymer and unidirectional fibers may comprise additional fillers and/or additives, in addition to the fibers. Examples of (additional) fillers include but are not limited to: steel fibers/whiskers/flakes, glass fibers, talc, carbon black, carbon fibers, nanocomposites/nanofibers.

Non-limiting examples of additional additives include coupling agents to promote adhesion between the polymeric matrix and continuous fibers, antioxidants, heat stabilizers, flow modifiers, flame retardants, UV stabilizers, UV absorbers, impact modifiers, colorants, or a combination thereof.

For the purpose of manufacturing the base part and/or elongate reinforcement part, a polymer composition, of an above mentioned polymer, and further comprising additives such as for example for fire resistance, UV protection, color, durability, may be provided.

Examples of suitable strips comprising a polymer and unidirectional fibers, of the elongate reinforcement part, are constituted by unidirectional (UD) fiber-reinforced composites as disclosed in WO 2016/142784, for example in paragraph [0010], which disclosure is incorporated by reference.

Such a fiber-reinforced composite as is known from WO 2016/142784 comprises: a matrix material including a thermoplastic material; and
a non-woven fibrous region comprising a plurality of continuous fibers dispersed in the matrix material;
wherein the width and the length of the non-woven fibrous region are substantially equal to the width and the length, respectively, of the fiber-reinforced composite;
wherein the non-woven fibrous region has a mean relative fiber area coverage (RFAC) (%) of from 65 to 90 and a coefficient of variance (COV) (%) of from 3 to 20; and
wherein each of the plurality of continuous fibers is substantially aligned with the length of the fiber-reinforced composite.

In case that the polymer in the base part and in the strip are the same, the beam may be recycled in a more efficient manner, at the end of its life cycle.

Optimal use of the elongate and further elongate reinforcement parts may be achieved if a width of the elongate reinforcement part and/or the further elongate reinforcement part is at least substantially equal to the width of the base part.

The base part may have been foamed, hollow or solid. If foamed, the foam part may have been coextruded with the remainder of the base part. In case that the base part is constituted by a hollow profile, the beam may be further optimized regarding its weight in relation to its stiffness and outer dimensions. An effect of the base part being foamed, including the embodiment that the base part is a hollow profile, filled with a foam, is increased isolation.

The beam may have structural features such as ribs or flanges, optionally integral with the base part, such as formed by extrusion, for the purpose of connecting the beam to its surrounding structure in use.

In an example, the Young's Modulus of the base part is in the range of 1000-15000 N/mm$^2$. The ratio of the Young's Modulus of the strip to the Young's Modulus of the base part is, in an example, in the range of 2:1 to 40:1, or, in an example, 3:1 to 20:1.

The strip comprising a polymer and unidirectional fibers may have a thickness in the range of 0.1-5 mm, preferably 0.2-2.5 mm.

The base part may have a height in the range of 50-700 mm, preferably 100-400 mm, and preferably the base part may have a width in the range of 10-50 percent of the height.

Corresponding embodiments are also applicable for the beam and building according to the present teachings, as detailed below, and vice versa.

In a further aspect, the invention relates to a structural beam, comprising an elongate base part comprising a polymer, the base part having a length, defining a length direction of the beam, and having a width and a height, and an elongate reinforcement part comprising a strip comprising a polymer and unidirectional fibers, bonded to the base part at an outer surface of the base part and extending in the length direction along the length of the base part, the strip having a higher Young's modulus than the base part. The elongate reinforcement part has preferably been bonded to the polymer base part while forming the base part by means of extrusion.

The structural beam according to the further aspect has preferably been manufactured in accordance with the method according to the first aspect of the present invention. Alternatively, the elongate reinforcement part and/or the further elongate reinforcement part may have been laminated onto the base part, optionally using a tie layer in order to safeguard to a large extent that the reinforcement part adheres to the base part. The skilled person knows which tie layers are suitable, e.g. adhesion of polycarbonate to polypropylene can be performed for example with a polyethylene or polypropylene grafted with maleic acid.

In a still further aspect, the invention relates to a building, comprising a structural beam according to the present invention, the structural beam supporting a part of the building, such as a roof of the building. The structural beam has been provided such that it is mainly subject to forces in the height direction of the structural beam, the elongate reinforcement part being provided at a lower outer surface of the base part of the beam.

BRIEF DESCRIPTION OF DRAWINGS

The present teachings are described hereinafter with reference to the accompanying schematic drawings in which examples of the invention are shown and in which like reference numbers indicate the same or similar elements.

FIG. 9b shows section IXb-IXb of FIG. 9a, and FIG. 9c shows front view IXc-IXc of FIG. 9a.

Throughout the figures, components which are equal, or at least function in a similar manner, have been indicated with the reference signs to which each time 100 is added. The figures are not to scale as to the thickness of any reinforcement parts (to be explained in detail below) relative to a height dimension of the respective beams.

DESCRIPTION OF EMBODIMENTS

Figure 1:
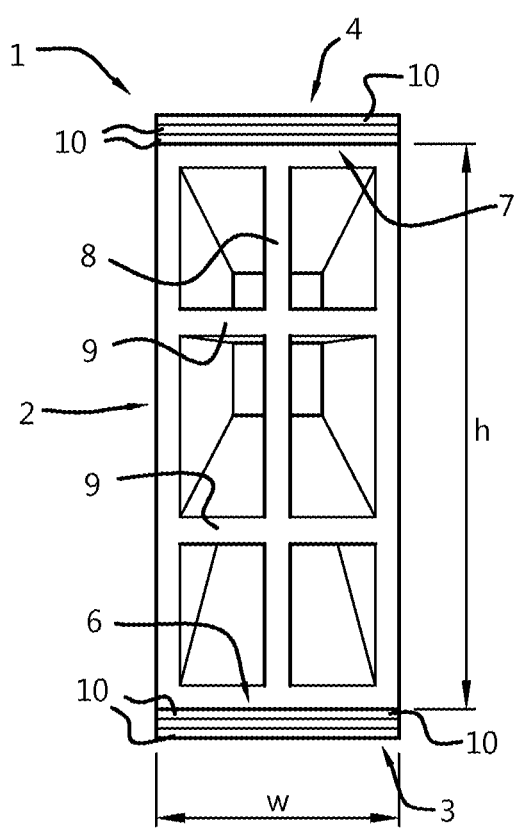
FIG. 1 shows, in front perspective view, a first example of a beam according to the present invention.
Figure 5:
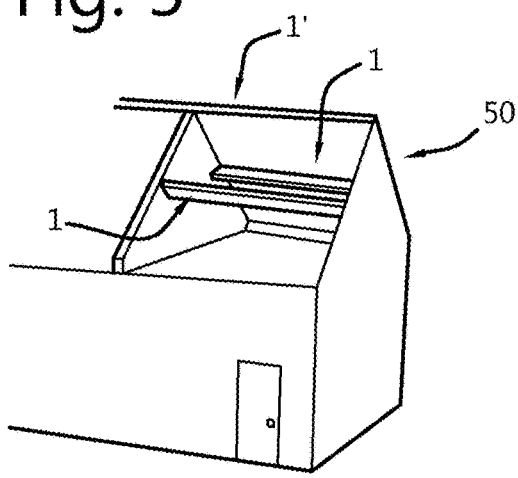
FIG. 5 shows, in perspective view, a part of an example of a building according to the present invention, having a beam according to the present invention.

FIG. 1 shows a structural beam 1 for use as a building or civil engineering structural element, such as a roof beam. An example of a manner in which the beam 1, or any other example of a beam according to the present invention described above and/or below, may be used in practice is shown in FIG. 5. FIG. 5 shows part of a building 50. A pitched roof of the building is still to be provided. A support construction for the roof comprises two roof beams according to the present invention, more specifically purlins 1 as well as a ridge beam 1'. The ridge beam 1' may have identical dimensions compared to purlins 1, optionally other than the length thereof, or may have different dimensions. Its height may for example be greater. Any of the beams according to the invention may be used as a roof beam such as a mentioned purlin or ridge beam as shown in FIG. 5, for example.

The structural beam 1 as shown in FIG. 1 has an elongate base part 2 of a polymer. The beam has a length of 6 m, at least in the present example, defining a length direction of the beam 1 perpendicular to the plane of the paper. The base part has a width w of 100 mm and a height h of 400 mm. The base part 2 comprises polypropylene filled with 20 wt. % glass fiber. The beam 1 is of rectangular cross section having a height greater than its width. In use the beam 1 is intended to be used such that the beam is mainly subject to forces in the height direction. That means, the resistance to bending is greater in the height direction compared to the width direction. For weight reduction purposes the base part 2 is formed as a hollow profile, at least in the present example, having one central, vertical inner rib 8 and two horizontal inner ribs 9. In an embodiment, one or more cavities of the hollow profile of the base part 2 may be filled such as with a foam such as polypropylene foam.

The beam 1 has an elongate reinforcement part 3 formed by a multiple, in the present example three, strips 10 comprising a polymer and unidirectional fibers, bonded to the base part 2 at its bottom outer surface 6. More specifically the three strips 10 are bonded to each other so as to form a stack of strips, and are each made of glass filled polypropylene, having a glass fiber content, for example in the range of 35 to 85 volume %. The stack of strips forming the elongate reinforcement part 3 extends in the length direction along the entire length of the base part 2. As FIG. 1 shows, a width of the stack 3 is equal to the width of the base part 2. In another example, the width of the stack may be slightly smaller than the width of the base part. In other examples, the stack may have less or more than three strips, such as 2, 4, 5, 6, 7, 8, 9 or 10 strips, the number depending on parameters such as the material properties and the thickness of individual strips. The presence of the elongate reinforcement part 3 on the bottom surface of the base part 2 of the beam 1 increases the bending stiffness, i.e. resistance to bending.

The beam 1 also has a further elongate reinforcement part 4, also formed by a stack of three strips 10 comprising the same polymer and unidirectional fibers as the strips 10 of stack 3, bonded to the base part at its top outer surface 7. The stack of strips 4 extends in the length direction along the length of the base part 2 and is identical to the stack 3. Therefore the above description of stack 3 also applies to stack 4. In other embodiments the further elongate reinforcement part 4 may have more or less strips than the elongate reinforcement part 3.

At least in the present example the strips 10 each have a thickness of 0.5 mm, that means in the direction of the height of the beam 1.

The elongate reinforcement parts 3 and 4 have been bonded to the polymer base part 2 while forming the base part 2 by means of extrusion, by feeding a polymer composition for forming the base part 2 via an extruder to an extrusion die, and feeding the strips 10 of the elongate reinforcement parts 3 and 4, to the extrusion die, thereby forming the beam 1 while bonding the elongate reinforcement parts 3, 4 to the base part 2 during the forming of the base part 2. Within the extrusion die, the polymer composition and the strips 10 are joined so as to bond them together. The polymer composition also flows between the individual strips, so as to firmly bond them together, and to the base part. Such a method will be explained below with reference to FIGS. 9a-9c.

Figure 2:
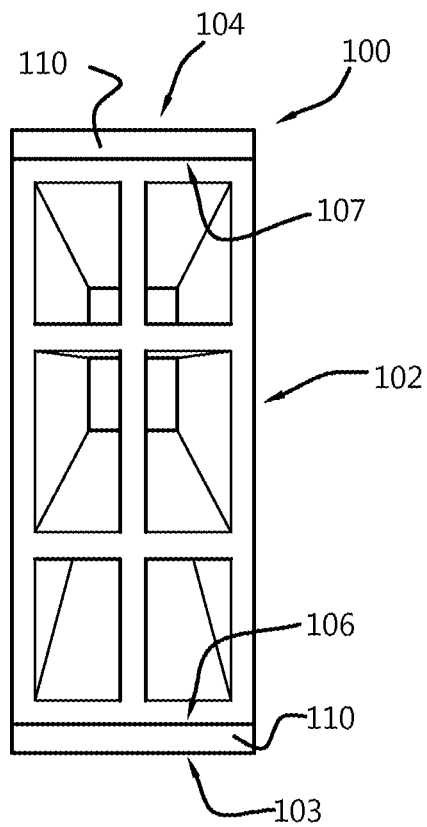
FIG. 2 shows, in front perspective view, a second example of a beam according to the present invention.

FIG. 2 shows a beam 100 which is highly similar to beam 1. Beam 100 also has a base part 102, identical to base part 2. However, instead of two stacks of (each) three strips 10 forming the respective elongate reinforcement parts 3, 4 of beam 1, beam 100 comprises elongate reinforcement parts 103, 104 each formed by a single strip 110 comprising a polymer and unidirectional fibers, bonded to the base part 102 at its bottom outer surface 106 and top outer surface 107, respectively. Like beam 1, the elongate reinforcement parts 103 and 104 of beam 100 have been bonded to the polymer base part 102 while forming the base part 102 by means of extrusion.

Figure 3:
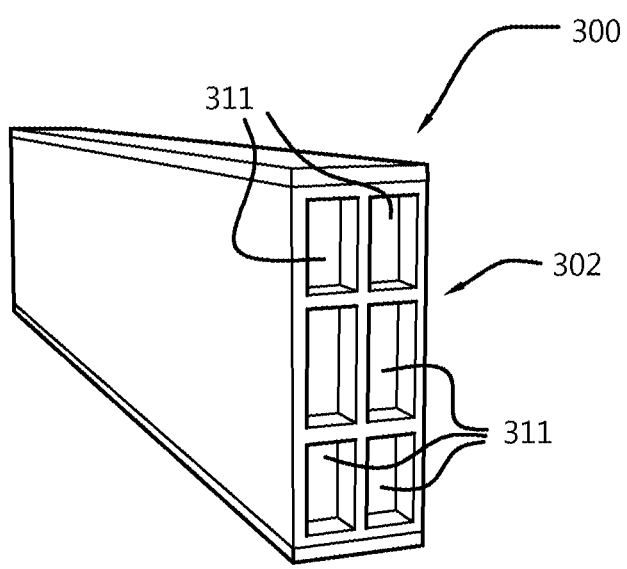
FIG. 3 shows, in perspective view, the beam of FIG. 2.

FIG. 3 shows a beam 300 which is identical to beam 100, except for the fact that the cavities of the hollow profile base part 302 are filled with a polyurethane foam 311.

Figure 4:
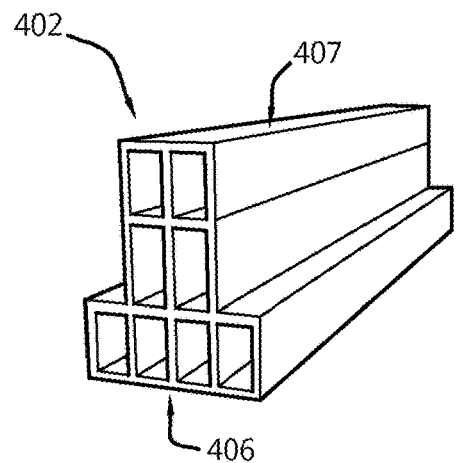
FIG. 4 shows, in perspective view, a part of a third example of a beam according to the present invention.

FIG. 4 shows a base part 402 of a beam according to the invention. The base part is formed as a hollow profile base part but, other than the rectangular base parts 2, 102 and 302, it has a reversed T-shape cross section. At least one of the top outer surface 407 and the lower outer surface 406 of the base part 402 may be provided with an elongate reinforcement part comparable to reinforcement parts 3, 4; 103, 104.

Figure 6:
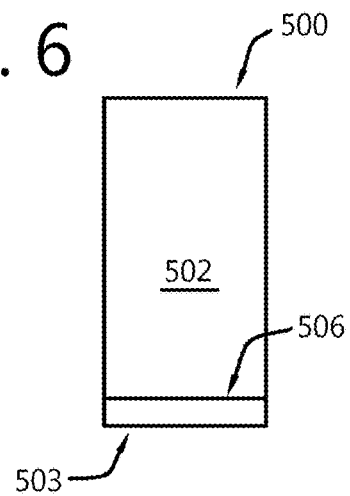
FIGS. 6-8b show, in front view, a fourth, fifth and sixth example of a beam according to the present invention, respectively.

FIG. 6 shows a further example of a beam according to the invention, in the form of a beam 500 having a solid elongate base part 502 of rectangular cross section and, only at its bottom outer surface 506, an elongate reinforcement part 503 formed by a single strip comprising a polymer and unidirectional fibers. The strip may have been bonded to the base part by means of extrusion.

Figure 7:
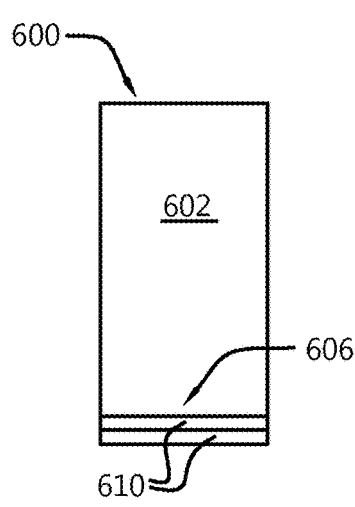

FIG. 7 shows a further example of a beam, in the form of a beam 600 having a solid elongate base part 602 of rectangular cross section and, only at its bottom outer surface 606, an elongate reinforcement part 603 formed by a stack of two strips 610 comprising a polymer and unidirectional fibers, laminated onto the base part. The stack may alternatively have been bonded to the base part by means of extrusion.

Figure 8A:
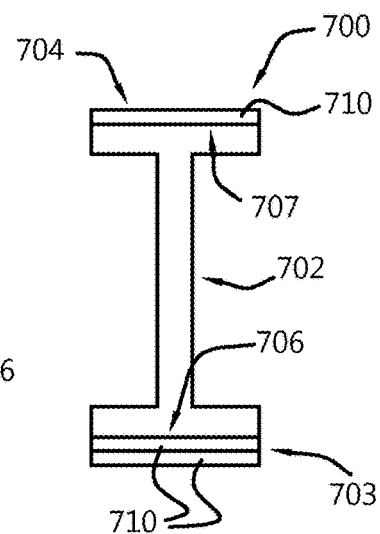

FIG. 8a shows a further example of a beam, in the form of a beam 700 having a solid elongate base part 702 of an I-shaped cross section. At the bottom outer surface 706, an elongate reinforcement part 703 formed by a stack of two strips 710 comprising a polymer and unidirectional fibers is provided. At its top outer surface 707, a further elongate reinforcement part 704 formed by a single strip 710 comprising a polymer and unidirectional fibers is provided. Both the reinforcement parts have been bonded to the base part by means of lamination. The reinforcement parts may alternatively have been bonded to the base part by means of extrusion.

Figure 8B:
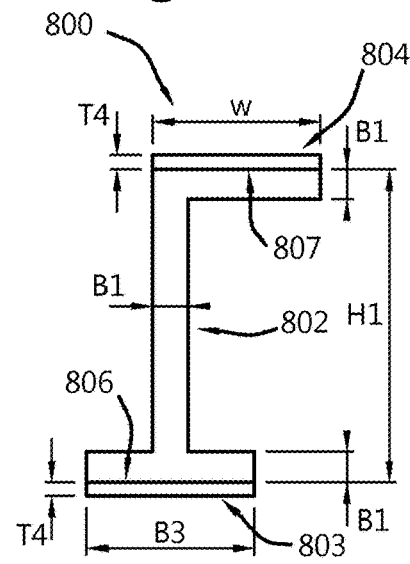

FIG. 8b shows a further example of a beam according to the invention, in the form of a beam 800 having a solid elongate base part 802 having, as lower half, an I-shaped cross section, and, as upper half, a reversed L-shaped cross section. At the bottom outer surface 806, an elongate reinforcement part 803 formed by a strip comprising a polymer and unidirectional fibers is provided. At its top outer surface 807, a further elongate reinforcement part 804 formed by a strip comprising a polymer and unidirectional fibers is provided. Both the strips have been bonded to the base part by means of extrusion.

Figure 9A:
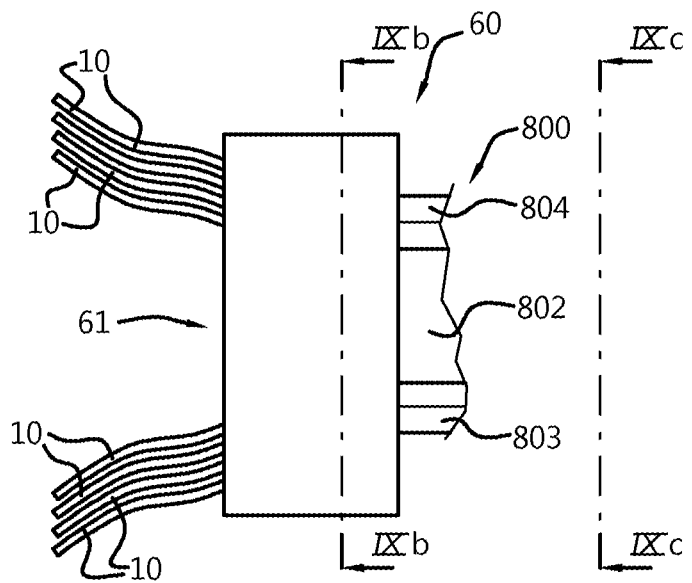
FIG. 9a shows, in side view, an example of an extrusion die, shown highly simplified for the purpose of explaining the manufacturing process according to the invention.
Figure 9B:
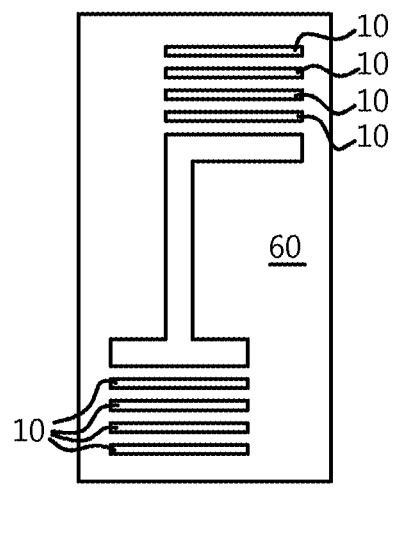
Figure 9C:
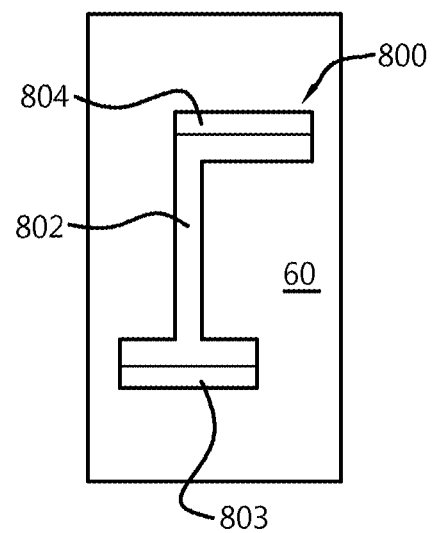

FIGS. 9a-9c show an example of an extrusion die 60 for use in a method of manufacturing of the beam 800 according to FIG. 8b. A similar process, using a similar die, adapted to the cross-sectional shape of the base part to be formed and adapted to the requirements as to the reinforcement parts (absent; single strip; stack of strips) to be bonded to the top and/or bottom outer surfaces of the base part to be formed, can be used for manufacturing any of the beams according to the invention as discussed throughout the present description. The method comprises the steps of feeding a polymer composition, such as (melted) polymer granules, via an extruder (not shown), to the extrusion die 60, via an inlet 61. Said polymer composition is used for forming by extrusion the base part 802 of the beam 800. Also, in the present example, two sets of four strips 10 (individual strips not shown in detail) comprising a polymer and unidirectional fibers are fed to the extrusion die 60, each set for forming a stack of strips within the die 60, forming the elongate reinforcement parts 803 and 804 respectively. Using the extrusion die 60, and the extrusion process, the base part 802 is formed while bonding the elongate reinforcement parts 803, 804, each formed in the extrusion die 60 from four strips 10, to the base part 802 during the forming of the base part 802. A feed speed of the strips 10 to the die 60 is set equal to the speed of extrusion. The polymer composition also flows between the individual strips of the respective reinforcement parts within the die 60, so as to firmly bond the strips together, and to the base part.

EXAMPLES

It should be clear to the person skilled in the art that with the beam of the invention, it is possible to achieve a similar resistance to bending at a significantly reduced weight (such as a thinner beam, for example) by using elongate reinforcement parts.

It should also be clear to the person skilled in the art that with the beam of the invention, at the same weight as compared to the beam without elongate reinforcement parts, the resistance to bending can be increased.

For the purpose of demonstrating the effect of the elongate reinforcement parts in the structural beams according to the present invention, in an example, a calculation comparison was made between a beam with the shape as indicated in FIG. 8b with and without reinforcement parts. In addition, the material of the beam with reinforcement parts was varied.

The beam of the comparative examples had the following characteristics:

| | |
|---|---|
| Width at top (w) | 100 mm. |
| Thickness of beam (B1) | 4 mm. |
| Height of beam (H1) | 296 mm. |
| Width at foot (B3) | 100 mm. |
| I (second moment of inertia) | $1.32 * 10^7$ mm$^4$ |
| density of polypropylene A | 900 kg/m$^3$ |
| density of polypropylene A filled with 30 wt % glass fiber B | 1120 kg/m$^3$ |

As reinforcement, reinforcement parts were provided on the exterior and interior side as indicated in FIG. 8b. The reinforcement parts had the following characteristics:

| | |
|---|---|
| Width (B3) | 100 mm. |
| Total thickness (T4) | 2 mm. |
| Material | polypropylene A, filled with unidirectional glass fibers (70 wt % glass based on the total of polypropylene A and glass fibers) density: 1670 kg/m$^3$ |
| Young's modulus of reinforcement part | 35000 N/mm$^2$ |

The bending resistance was calculated according to formula 1:

$$\text{resistance to bending} = E*I \quad \text{(formula 1)}$$

The resistance to bending per meter is the resistance to bending divided by the height of the beam (H1). The Young's modulus was determined according to ISO527/1B (version as in force as of Jan. 1, 2016).

| | CE 1 | Example 1 | Example 2 |
|---|---|---|---|
| material | polypropylene A (without glass fiber B) | polypropylene A (without glass fiber B) | polypropylene A, filled with 30 wt % glass fiber B |
| Reinforcement (elongate reinforcement parts 480 and 483 of FIG. 13) | No | Yes | Yes |
| Thickness of beam of roof forming element (B1) (mm) | 4 | 4 | 4 |
| Weight (kg) per meter length | 1.8 | 2.1 | 2.6 |
| E (Young's modulus) (N/mm$^2$) of the elongate base part | 1450 | 1450 | 7000 |
| Resistance to bending (per meter roof forming element) (kNm$^2$) | 39 | 195 | 343 |

As can be seen from the above Table, the beams of the invention have a significantly increased resistance to bending at the same dimensions. In addition, it is shown that preferably the elongate base part comprises in addition to the polymer, also reinforced fibers.

The calculations were repeated to compare the beam of an example 3, having a reduced total thickness (T4) of the reinforcing element of 1 mm, and having a reduced beam thickness (B1) of 2 mm, to the dimensions of a wood beam having the same resistance to bending as the beam of example 3.

| | Example 3 | CE 2 |
|---|---|---|
| material | | Atlantic white cedar |
| Density (kg/m$^3$) | | 770 |
| E-modulus | | 5200 |
| Width at top (W) (mm) | 100 | 100 |
| Thickness of beam (B1) (mm) | 2 | 4 |
| Height of beam (H1) (mm) | 296 | 296 |
| Width at foot (B3) (mm) | 100 | 100 |
| Weight (kg) | 1.4 | 1.5 |

As can be seen from the above example, traditional wooden beams may be replaced by structural beams of the invention while maintaining the dimensions. In addition, the structural beams of the invention are lighter as compared to wood enabling easier construction.

The structural beams of the invention have the advantage that they can be prepared in any dimension, whereas with wood, additional processing steps, such as gluing or screwing need to be performed. Therefore, the dimensional tolerance of the structural beams of the invention is extremely high. In addition, natural variances in E-modulus in the structural beam of the invention are almost non-existent, whereas in a wooden beam variances may be present for example due to the presence of knots and other irregularities.

The invention claimed is:

1. A method of manufacturing a structural beam comprising
   an elongate base part comprising a polymer, the base part having a length, defining a length direction of the beam, and having a width and a height and a thickness, and
   an elongate reinforcement part comprising a strip comprising a polymer and unidirectional fibers, bonded to the base part at an outer surface of the base part and extending in the length direction along the length of the base part,
   the strip of the elongate reinforcement part having a higher Young's modulus than the base part,
   the method comprising
      feeding a composition comprising the polymer for forming the elongate base part, via an extruder, to an extrusion die,
      feeding the elongate reinforcement part comprising the strip to the extrusion die,
      forming the beam by extrusion, while bonding the elongate reinforcement part to the base part by joining the elongate reinforcement part and the composition within the extrusion die, wherein the base part has a width in the range of 10-50 percent of the height.

2. The method according to claim 1, further comprising bonding a further elongate reinforcement part comprising a further strip comprising a polymer and unidirectional fibers to the base part at a further outer surface of the base part opposite the outer surface and extending in the length direction along the length of the base part.

3. The method according to claim 2, wherein the further elongate reinforcement part of the beam to be formed comprises multiple strips comprising a polymer and unidirectional fibers bonded to each other, wherein during the step of feeding, said further elongate reinforcement part comprising the multiple strips is fed to the extrusion die for the purpose of bonding said further elongate reinforcement part to said further outer surface of the base part.

4. The method according to claim 2, wherein a width of the elongate reinforcement part and/or the further elongate reinforcement part is at least substantially equal to the width of the base part.

5. The method according to claim 1, wherein the elongate reinforcement part of the beam to be formed comprises multiple strips comprising a polymer and unidirectional fibers bonded to each other, wherein during the step of feeding, said elongate reinforcement part comprising the multiple strips is fed to the extrusion die.

6. The method according to claim 1, wherein the polymer of the base part is chosen from the group consisting of thermoplastic polymers, including co-polymers, or blends thereof.

7. The method according to claim 1, wherein the polymer of the strip is chosen from the group consisting of thermoplastic polymers, including co-polymers, or blends thereof.

8. The method according to claim 1, the base part being constituted by a hollow profile.

9. The method according to claim 8, the hollow profile of the base part being filled with a foam.

10. The method according to claim 1, wherein the strip comprising a polymer and unidirectional fibers has a thickness in the range of 0.1-5 mm and the base part has an I shaped cross section half and a reversed L-shaped cross section half.

11. The method according to claim 1, wherein the base part has a height in the range of 50-700 mm.

12. The method according to claim 1, further comprising bonding a further elongate reinforcement part comprising a further strip comprising a polymer and unidirectional fibers to the base part at a further outer surface of the base part opposite the outer surface and extending in the length direction along the length of the base part;

wherein the elongate reinforcement part of the beam to be formed comprises multiple strips comprising a polymer and unidirectional fibers bonded to each other;

wherein during the step of feeding, said elongate reinforcement part comprising the multiple strips is fed to the extrusion die;

wherein the strip comprising a polymer and unidirectional fibers has a thickness in the range of 0.1-5 mm;

wherein the base part has a height in the range of 50-700 mm;

wherein the base part has a width in the range of 10-50 percent of the height;

wherein the further elongate reinforcement part of the beam to be formed comprises multiple strips comprising a polymer and unidirectional fibers bonded to each other;

wherein during the step of feeding, said further elongate reinforcement part comprising the multiple strips is fed to the extrusion die for the purpose of bonding said further elongate reinforcement part to said further outer surface of the base part; and wherein a width of the elongate reinforcement part and/or the further elongate reinforcement part is at least substantially equal to the width of the base part.

13. The method according to claim 12, the base part being constituted by a hollow profile filled with a foam.

14. The method according to claim 1, wherein the strip comprising a polymer and unidirectional fibers has a thickness in the range of 0.2-2.5 mm.

15. The method according to claim 1, wherein the base part has a height in the range of 100-400 mm.

16. The method according to claim 1, wherein the elongate base part has a top outer surface extending in the length direction and at least one side outer surface extending in the length direction; wherein the strip is located on the top outer surface and wherein the strip is not located on the at least one side outer surface.

17. The method according to claim 1, wherein the structural beam is configured to support a roof of a building.

18. A method of supporting a roof of a building comprising:

manufacturing a structural beam according to the method of claim 1; and supporting the roof of the building with the structural beam.

* * * * *